(12) United States Patent
Adair et al.

(10) Patent No.: US 8,375,557 B2
(45) Date of Patent: Feb. 19, 2013

(54) SYSTEMS AND METHODS OF BEVELING BOWLING BALL HOLES

(75) Inventors: Clifton E. Adair, Richmond, VA (US); Jody R. Bullis, Richmond, VA (US)

(73) Assignee: Qubicaamf Worldwide LLC, Mechanicsville, VA (US)

( * ) Notice: Subject to any disclaimer, the term of this patent is extended or adjusted under 35 U.S.C. 154(b) by 783 days.

(21) Appl. No.: 12/415,367

(22) Filed: Mar. 31, 2009

(65) Prior Publication Data

US 2009/0279967 A1 Nov. 12, 2009

Related U.S. Application Data

(60) Provisional application No. 61/051,461, filed on May 8, 2008.

(51) Int. Cl.
*B23P 13/04* (2006.01)

(52) U.S. Cl. .............. 29/558; 29/56.6; 407/54; 473/128

(58) Field of Classification Search .................. 29/557, 29/558, 56.5, 56.6; 407/62, 65, 54; 408/1 R, 408/1 BD; 473/125, 127, 128; 83/869; 147/13
See application file for complete search history.

(56) References Cited

U.S. PATENT DOCUMENTS

| | | | |
|---|---|---|---|
| 1,430,895 A | 10/1922 | Fetterly | |
| 1,725,515 A * | 8/1929 | Hawkinson et al. | 76/119 |
| 2,719,995 A | 10/1955 | Hohenstein | |
| 2,856,679 A | 10/1958 | Burkhardt | |
| 2,879,679 A | 3/1959 | Neff | |
| 2,948,168 A | 8/1960 | McCormick | |
| 3,083,509 A * | 4/1963 | Sevast | 451/456 |
| 3,095,767 A * | 7/1963 | Jesonis | 408/1 R |
| 3,140,640 A * | 7/1964 | Egger | 409/206 |
| 3,262,340 A | 7/1966 | Sammons et al. | |
| 3,263,531 A * | 8/1966 | Sammons et al. | 408/97 |
| 3,304,814 A | 2/1967 | Scott | |
| 3,316,588 A | 5/1967 | Vezirakis | |
| 3,329,043 A * | 7/1967 | Stanford | 408/20 |
| 3,349,647 A * | 10/1967 | Stan | 409/132 |
| 3,415,146 A * | 12/1968 | Schroeder, Jr. | 408/88 |
| 3,435,729 A | 4/1969 | Toth | |
| 3,454,440 A | 7/1969 | Vezirakis | |
| 3,673,685 A | 7/1972 | Eppolito | |
| 3,689,165 A | 9/1972 | Small | |
| 3,718,958 A * | 3/1973 | Brucker | 407/48 |
| 3,774,909 A | 11/1973 | Linden | |
| 3,805,394 A | 4/1974 | Marberg | |
| 3,875,668 A * | 4/1975 | Taylor | 408/1 R |
| 3,878,762 A * | 4/1975 | Goldsmith | 409/93 |

(Continued)

FOREIGN PATENT DOCUMENTS

DE 20 2004 003080 6/2004

OTHER PUBLICATIONS

Extended European Search Report Appln. No. EP09005679.7-1260 Dated Sep. 29, 2009.

(Continued)

*Primary Examiner* — David Bryant
*Assistant Examiner* — Christopher Koehler
(74) *Attorney, Agent, or Firm* — Andrew M. Calderon; Roberts Mlotkowski Safran & Cole, P.C.

(57) ABSTRACT

Disclosed are systems and methods of beveling gripping holes of bowling balls. A method includes creating a bevel at an edge of a hole of the bowling ball by removing material from the bowling ball using a rotary tool equipped with a shaping bit that extends into the hole.

13 Claims, 3 Drawing Sheets

U.S. PATENT DOCUMENTS

| | | | |
|---|---|---|---|
| 3,964,726 A * | 6/1976 | Ott et al. | 249/90 |
| 3,971,164 A * | 7/1976 | Albin et al. | 451/283 |
| 4,221,514 A | 9/1980 | Pavlovsky | |
| 4,243,348 A * | 1/1981 | Paige | 408/186 |
| 4,800,686 A * | 1/1989 | Hirabayashi et al. | 451/41 |
| 6,053,673 A * | 4/2000 | Swift et al. | 407/42 |
| 6,471,450 B1 * | 10/2002 | Mercier | 408/1 R |
| 7,147,409 B2 * | 12/2006 | Wienhold | 408/1 R |
| 7,185,412 B2 * | 3/2007 | Penick et al. | 29/560 |
| 7,810,532 B2 * | 10/2010 | Bird | 144/241 |
| 7,862,263 B2 * | 1/2011 | van Iperen | 407/60 |
| 2006/0130624 A1 * | 6/2006 | Bocaccio et al. | 83/14 |
| 2006/0242818 A1 * | 11/2006 | Penick et al. | 29/560 |
| 2007/0207871 A1 | 9/2007 | Traub | |
| 2008/0039220 A1 * | 2/2008 | Lasseigne | 473/130 |
| 2008/0039221 A1 * | 2/2008 | Lasseigne | 473/130 |
| 2008/0193232 A1 * | 8/2008 | van Iperen | 407/54 |

OTHER PUBLICATIONS

Partial European Search Report Appln. No. EP09005679.7-1260 Dated Jun. 16, 2009.

* cited by examiner

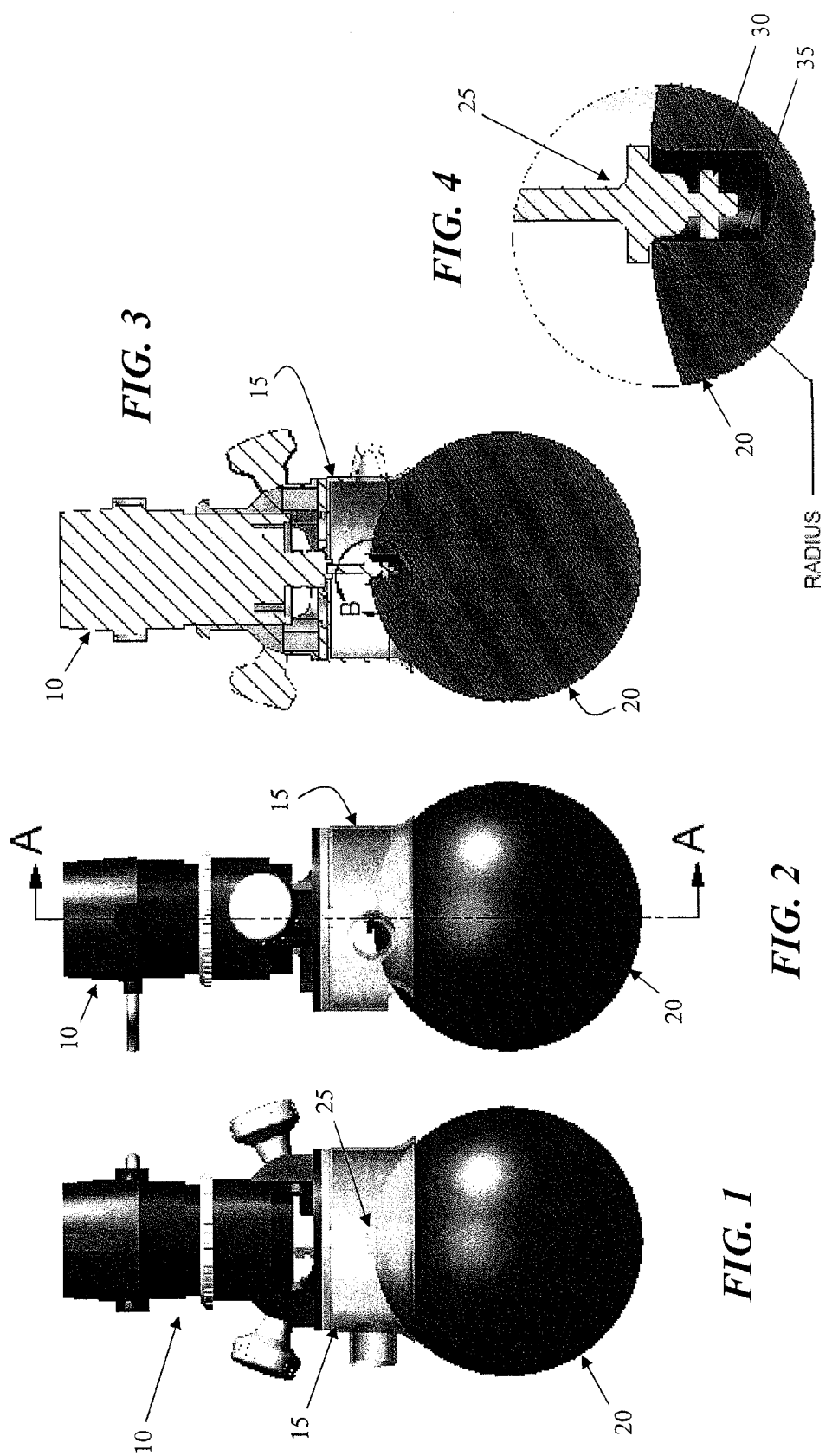

SYSTEMS AND METHODS OF BEVELING BOWLING BALL HOLES

CROSS REFERENCE TO RELATED APPLICATIONS

This application claims priority under 35 U.S.C. §119 to U.S. Provisional Application No. 61/051,461 filed on May 8, 2008, the contents of which are incorporated herein by reference in their entirety.

BACKGROUND OF THE INVENTION

1. Field of the Invention

The invention relates generally to bowling balls, and more specifically to systems and methods of drilling and fitting a bowling ball to a bowler's hand.

2. Discussion of Background Information

The finger and thumb holes in bowling balls have traditionally been drilled with an upright drill press or milling machine, and in some cases with a horizontal boring machine. After drilling, the top edge of the hole is extremely sharp and requires beveling or chamfering in order not to cut the bowler's fingers or thumb and to provide a comfortable bowling grip that does not cause stress, bruising, or irritation of the bowler's hand.

Beveling or chamfering is usually accomplished manually with a three edged knife called a bevel knife. To bevel/chamfer the ball, a ball drilling technician will hold the bevel knife with one sharp edge perpendicular to the edge of the hole, and then begin carving or scraping the hole with the edge of the knife. As the sharp edge of the ball is removed, the technician will continue to scrape, rotating the knife until it becomes tangent to the circumference of the ball. The scraping continues until the edge of the hole has a smooth radius. This process is continued around the entire circumference of the hole. Once the holes are beveled with the bevel knife, the technician may use a high speed sander equipped with a long shank approximately 6" long and a sanding disk of 1" to 1.5" in diameter. The high speed sander is then used to remove irregular knife marks left behind by the bevel knife, and to smooth the bevel and interior walls of the hole. In this process the operator installs the sand paper (usually 80 to 120 grit) on the shank of the sander, turns the sander on, and slowly enters the bowling ball hole, while reciprocating the sander up and down until the desired bevel and/or smoothness is achieved.

Alternatively to using the bevel knife, a technician may use only a high speed sander to bevel the holes. In this method, the operator usually chooses a coarser grit sand paper as described above (e.g., 80 grit) and installs it on the high speed sander shank, then turns on the sander, and slowly inserts the spinning sandpaper disk into the hole, continuously reciprocating the sander up and down until the desired bevel is achieved. This process requires frequent changes of the sandpaper discs as the sandpaper wears out quickly since the sandpaper is removing much more of the bowling ball material than in the bevel knife and high speed sander method. At this point the operator may elect to choose a finer grit sand paper, replacing the coarser grit on the high speed sander, and sand the hole again to produce a smoother surface on the interior of the drilled hole, and the bevel of the hole.

Problems with the traditional methods described above (e.g., bevel knife and/or high speed sander) are that these processes are not conducive to beveling "house balls" (e.g., bowling balls the bowling center provides to their patrons for use when the bowler/patron does not have their own custom fitted bowling ball). Typically, ball drilling technicians achieve only a ⅛" to ¼" radius because of the amount of time it takes to scrape each hole, and then sand with the high speed sander, or if using the alternative method, the excessive amount of time it takes to replace the sandpaper frequently. Additionally, since the bevel of each hole is hand crafted, the amount of bevel between holes, and the amount of bevel from ball to ball is inconsistent. Inconsistent bevels from ball to ball feel different in the bowler's hand. This is not desirable by the bowling center proprietor as some bowlers may feel that some balls are comfortable, while other balls are not.

SUMMARY OF THE INVENTION

Exemplary embodiments and advantages of the present invention may be ascertained by reviewing the present disclosure and the accompanying drawing. In accordance with a first aspect of the invention, there is a method for beveling a hole of a bowling ball. The method includes creating a bevel at an edge of a hole of the bowling ball by removing material from the bowling ball using a rotary tool equipped with a shaping bit that extends into the hole. The bevel may have a predetermined shape that matches a shape of the shaping bit. The method may further comprise positioning the shaping bit relative to the hole using a positioning structure.

In embodiments, the rotary tool comprises a router and the shaping bit comprises a router bit, and the creating comprises causing a bearing of the router bit to ride an inner circumferential wall of the hole as a cutting blade of the router bit removes material from the bowling ball at the edge. The method may further comprise placing a shield attached to the router on an outer surface of the bowling ball while inserting the router bit into the hole. The method also comprise adjusting the router so that an upper edge of a cutting blade of the router bit is located above an outer surface of the bowling ball and another portion of the cutting blade is located within the hole.

In embodiments, the method additionally comprises creating another bevel at another edge of another hole of the bowling ball by removing material from the bowling ball using the rotary tool and the shaping bit. A shape and radius of the bevel are essentially the same as a shape and radius of the other bevel.

According to aspects of the invention, the bevel has at least one of a predetermined radius, curvature, and shape defined by a profile of the shaping bit. The method may further comprise sanding the bevel after the creating the bevel. The method may also comprise removing excess material from the hole after the creating the bevel.

In accordance with further aspects of the invention, the method comprises drilling the hole in the bowling ball before the creating the bevel. The drilling comprises: providing a marking on the bowling ball in a predetermined relation to a center line and a center of gravity of the bowling ball; placing the bowling ball in a bowling ball drilling fixture; aligning the marking with a drill bit; and drilling the hole in the bowling ball with the drill bit at the marking.

In accordance with further aspects of the invention, the method comprises prepping the bowling ball for beveling before the creating the bevel. The prepping comprises at least one of: removing loose material from the hole after drilling, and securing the bowling ball to a work bench.

In embodiments, the method includes controlling a position of the shaping bit relative to the bowling ball using a robotic arm. The robotic arm may carry the rotary tool and the shaping bit.

In accordance with a further aspect of the invention, there is an apparatus for beveling a hole of a bowling ball. The apparatus comprises a rotary tool equipped with a shaping bit and a positioning structure that maintains a position and orientation of the shaping bit relative to a hole of the bowling ball. The positioning structure maintains the shaping bit at least partially within the hole during beveling of the hole.

In embodiments, the rotary tool comprises a router and the positioning structure comprises a shield connected to the router and configured to conform to and rest on an outer surface of the bowling ball. Also, the shaping bit comprises a router bit operatively connected to the router and configured to extend into the hole when the shield rests on an outer surface of the bowling ball, and a lowermost portion of the shield extends lower, relative to the router, than a lowermost portion of the router bit. The router bit may comprise a rounded cutting blade and a bearing configured to ride an inner circumferential wall of the hole as the cutting blade of the router bit removes material from the bowling ball at an upper edge of the hole.

In embodiments, the positioning structure comprises a robotic arm. The robotic arm may carry the rotary tool and the shaping bit.

According to another aspect of the invention, there is a bowling ball comprising a first hole comprising a first inner wall and a second hole comprising a second inner wall. A first beveled surface forms a first rounded transition from an outer surface of the bowling ball to the first inner wall, and a second beveled surface forms a second rounded transition from the outer surface of the bowling ball to the second inner wall. The first beveled surface has at least one of a predetermined radius of curvature and a predetermined shape, and the second beveled surface has at least one of a radius of curvature essentially equal to the predetermined radius of curvature and a shape essentially the same as the predetermined shape.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 1 and 2 show an exemplary system for beveling bowling ball holes according to aspects of the invention;

FIG. 3 shows a cross-sectional view of FIG. 2 along line A-A;

FIG. 4 shows a detail view of a portion of FIG. 3, defined by area B;

DETAILED DESCRIPTION OF THE PRESENT INVENTION

Figure 5:
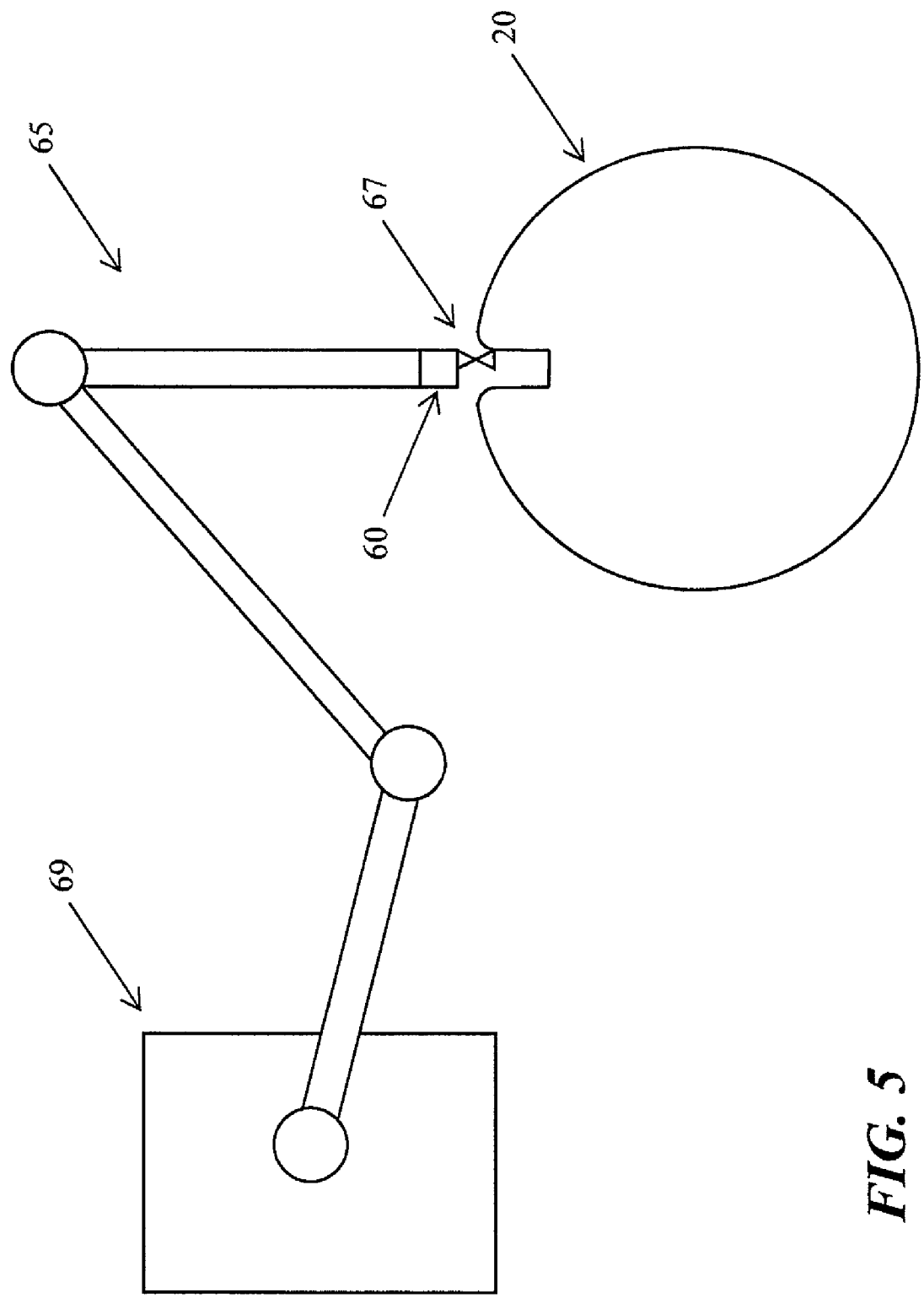
FIG. 5 shows a positioning structure in accordance with aspects of the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The invention relates generally to bowling balls, and more specifically to systems and methods of drilling and fitting a bowling ball to a bowler's hand. Embodiments of the invention provide a bevel having a radius of curvature of about 0.25" to about 0.50" on the hole(s) of a bowling ball. The increased radius of curvature provides more comfort for more people in handling the bowling ball. Particularly, since house balls are used by thousands of different bowlers throughout the life of the ball, it has been found herein that an increased radius of the bevel leads to more comfort for a greater number of bowlers. In embodiments, the increased bevel is created using a rotary tool equipped with a shaping bit, and a positioning structure that positions the shaping bit relative to the bowling ball, which is faster, more efficient, and more consistent than conventional techniques.

FIGS. 1 and 2 show a system including a rotary tool comprising a router 10 and a positioning structure comprising a router shield 15 used in embodiments of the invention. Routers and router shields are used for removing excessive ball plugging material from the exterior surface of the bowling ball. The router shield 15 is usually made of Lexan® or similar polycarbonate material. The router shield 15 mounts to the underside of the router 10, and it usually has an inlet for and outlet to attach a vacuum hose (not shown) for chip removal. The bottom of the router shield 15 conforms to and rests on the surface of a bowling ball 20 and it elevates the router 10 several inches from the surface of the bowling ball 20. For example, the shield may comprise a flared lower portion that conforms to the substantially spherical shape of the bowling ball 20.

When a router and router shield are used to remove excess hole-plugging material, the router shield allows the technician to lower a standard flat-tip router bit just above the exterior (e.g., outer spherical) surface of the bowling ball. As such, when utilized to remove excess plugging material from the outer surface of a bowling ball, the technician slides the router and router shield along the surface of the bowling ball removing any plugging material protruding above the surface of the bowling ball.

According to aspects of the invention, the router 10 is equipped with a shaping bit composed of a router bit 25 that differs in size and shape from a conventional flat-tip router bit used for removing excess hole-plugging material. In embodiments, the router bit 25 is a ⅜" round over bit, although the invention is not limited to this size and/or shape of router bit, and other sizes and/or shapes may be used.

In embodiments, the router 10, router shield 15, and router bit 25 are used to create a bevel for holes of bowling balls, the bevel having a predetermined shape. The router bit 25 may be used with the router 10 and router shield 15 described above. For example, in implementations of the invention, the height of the router bit 25 is adjusted relative to the router 10 such that the router bit 25 is lower, relative to the outer surface of the ball, than a flat-tip bit used for ball plug material removal (e.g., described above). In embodiments, in order to obtain a bevel at the edge of the hole, the router bit 25 may be adjusted relative to the router 10 and router shield 15 such that the router bit 25 is lowered beneath the surface of the bowling ball 20 (e.g., into a hole in the bowling ball) with the uppermost edge of the cutting blade of the router bit 25 being slightly above the surface of the bowling ball, as depicted in FIGS. 3 and 4. The router shield 15, by resting on the exterior surface of the bowling ball 20, positions the router bit 25 relative to the bowling ball 20. In this manner, the router bit 25 may be maintained in a position extending into the hole, as opposed to a flat-tip bit used for ball plug material removal that remains above the surface of the ball. As depicted in FIG. 4, the bevel has a predetermined shape matching the shape (e.g., profile) of the router bit 25. Although a single hole is depicted in FIGS. 3 and 4, it is understood that any desired number of holes (e.g., one, two, three, four, five, etc.) may be formed in the ball 20 in accordance with aspects of the invention.

The invention is not limited to the router 10, router shield 15, and router bit 25 described above. Instead, any rotary tool, shaping bit having a predefined shape, and positioning structure for positioning the shaping bit relative to the bowling ball may be used within the scope of the invention. For example, additionally or alternatively to a router, the rotary tool may comprise a drill press, computer numerical controlled (CNC) machine tool, or other rotary tool. Also, additionally or alternatively to a router shield, the positioning structure may comprise a frame, tripod, robotic arm, or some other structure that positions the shaping bit relative to the bowling ball such that the shaping bit is maintained at least partially within the gripping hole during the beveling operation. Moreover, alternatively to a router bit, the shaping bit may comprise any cutting bit for use with a rotary tool, whereby the cutting bit has a predetermined size and shape (e.g., cutting profile).

FIG. 5 shows another exemplary system in accordance with aspects of the invention in which a rotary tool 60 is carried by a robotic arm 65, with a shaping bit 67 connected to and driven by the rotary tool 50. The robotic arm 65, which constitutes the positioning structure, may be part of a CNC machine or other automated machine. For example, movement of the robotic arm 65 may be controlled by a combination of actuators (e.g., servo motors) and a computer controller 69. In this manner, the robotic arm 65 acts as the positioning structure that positions the shaping bit 67 relative to the bowling ball 20 (e.g., maintains the shaping bit 67 at least partially within the gripping hole during the beveling operation).

Figure 6:
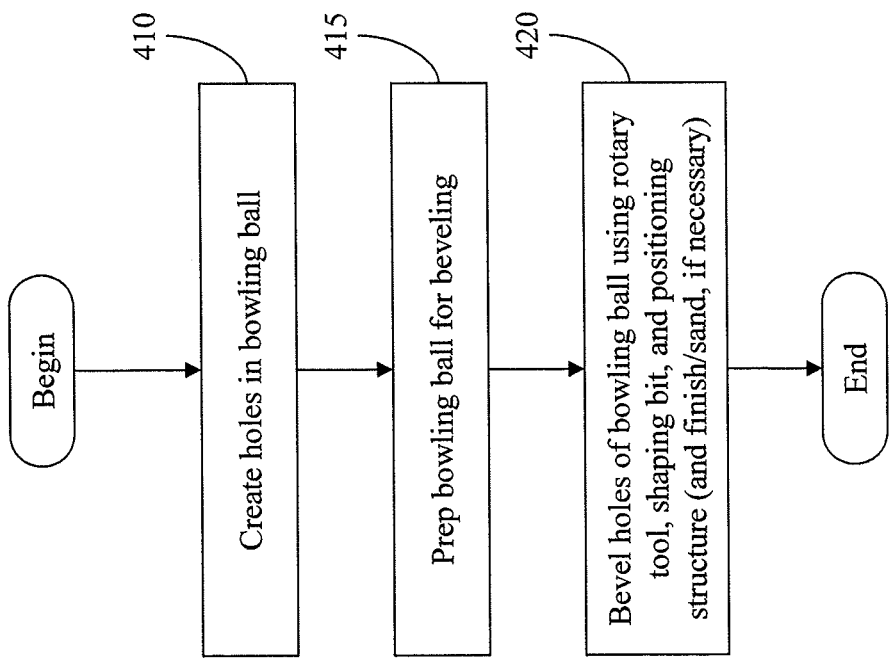
FIG. 6 shows a flow diagram depicting steps of an exemplary method according to aspects of the invention.

FIG. 6 shows a flow diagram depicting steps of an exemplary method according to aspects of the invention. At step 410, holes (e.g., gripping holes) are drilled in a bowling ball. This may be done, for example, by taking multiple measurements from a bowler's hand or using a predetermined drilling specifications for house balls, and making a vertical line also known as a center line (CL) on the bowling ball passing through a mark on the bowling ball that denotes the center of gravity (CG). A technician, for example, then draws intersecting marks on the CL equidistant from the CG, determined by the length of the span (i.e., the distance between the finger holes and the thumb holes). The technician then marks two addition lines parallel to the CL approximately 3/16" left and 3/16" right of the CL intersecting the horizontal mark for the finger drillings.

At this point the ball is placed in the ball drilling fixture for drilling, the ball drilling machine is adjusted to the desire pitch (the position of the hole relative to the exact center of the ball, could also be described as the angle of the hole), the desired drill bit size is selected and inserted into the drilling machine, the markings on the ball are then aligned with the drill bit, the ball is clamped into place, the drilling machine is turned on, and the hole is drilled. This process is repeated for any remaining holes.

At step 415, the ball is prepped for beveling. This may comprise, for example, vacuuming excess loose material (e.g., chips from the drilling) from the drilled holes. This step may also comprise, securing the bowling ball on a work bench, for example, using a clamp and/or jig.

At step 420, a bevel is created on each of the drilled holes. In embodiments, this comprises using the rotary tool, shaping bit, and positioning structure, as described above with respect to FIGS. 1-5. For example, the bevel may be created using the router, router shield, and round-over router bit described above with respect to FIGS. 1-4. For example, an operator (e.g., technician) will place the router or router shield on top of the ball with the round over router bit inside the hole, then (if needed) the technician will adjust the router so that uppermost edge of the cutting blade on the bit to slightly above the ball surface. Thus, the method may include placing a shield attached to the router on an outer surface of the bowling ball while inserting the round over bit into the hole, and adjusting the router so that an upper edge of a cutting blade of the round over bit is located above an outer surface of the bowling ball.

Subsequently, the technician will turn on the router and allow the lower ball bearing 30 of the round over router bit to ride the inner circumferential wall 35 of the hole as the cutting blade of the bit bevels the top of the hole. Once completed, the technician will proceed to the next hole. Thus, the method may include creating a second bevel at a second edge of a second hole of the bowling ball by removing material from the bowling ball using the router and the round over bit, wherein a shape and radius of the bevel are essentially the same as a shape and radius of the second bevel. The process can be performed for any gripping hole of the bowling ball, and can be repeated as many times as desired to provide a bevel at some or all of the gripping holes of the bowling ball.

After the holes are beveled the technician will determine if the hole(s) needs additional sanding due to the texture of the bowling ball's core (some cores have a rough texture and require light sanding with a fine grit sandpaper using a high speed sander). In most cases, additional sanding is not needed. Once the beveling process is complete, and any sanding is optionally performed, the holes are vacuumed and the ball is wiped clean.

A benefit of using embodiments of the invention is that a large bevel (e.g., having a radius of curvature of about 0.25" to about 0.5") can be made very quickly and consistently. For example, conventional methods that utilize a bevel knife and sander require about four minutes to create a bevel on a hole. Alternatively, using the sanding only method (e.g., no bevel knife), it requires about two minutes to create a bevel for a hole, and each hole requires a new piece of sandpaper disc. In contrast, by using the systems and methods according to aspects of the invention, a bevel of about 0.25" to about 0.5" can be made in about fifteen seconds.

Another benefit provided by embodiments of the invention is consistency. Conventional methods of producing a bevel (e.g., using a knife and/or sanding) are inconsistent in that the bevel for one hole is normally different in size and shape from the bevel of another hole. For example, when beveling by hand (e.g., using a knife and/or sandpaper), it is generally not possible to achieve a smooth radius to the outer surface of the ball. Moreover, both hand beveling methods leave a ridge where the bevel meets the surface of the ball. In contrast, by using implementations of the invention, the radius of every bevel is substantially the same and no ridge is created.

An even further benefit provided by embodiments of the invention is cost. In terms of materials, the main cost of beveling lies in the sandpaper discs consumed during the optional sanding process. In embodiments of the invention this material cost comes to about $0.005 per hole, while the cost of beveling a hole using conventional methods comes to about $0.02 per hole. Also, the labor costs to bevel holes is reduced by using implementations of the invention, since it takes far less time to bevel each hole using embodiments of the invention. For example, when beveling 100,000 balls per year (e.g., 300,000 holes), implementations of the invention provide a labor savings of about 1250 man-hours per year and a materials savings of about $4500.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method for beveling a hole of a bowling ball, comprising:
    creating a bevel at an edge of a hole of the bowling ball by removing material from the bowling ball using a rotary tool equipped with a shaping bit that extends into the hole,
    wherein the rotary tool comprises a router;
    the shaping bit comprises a router bit; and
    the creating comprises causing a bearing of the router bit to ride an inner circumferential wall of the hole as a cutting blade of the router bit removes material from the bowling ball at the edge, and
    further comprising placing a shield attached to the router on an outer surface of the bowling ball while inserting the router bit into the hole.

2. The method of claim 1, wherein the bevel has a predetermined shape that matches a shape of the shaping bit.

3. The method of claim 1, further comprising positioning the shaping bit relative to the hole using the shield.

4. The method of claim 1, further comprising adjusting the router bit relative to the router and the shield so that an upper edge of a cutting blade of the router bit is located above an outer surface of the bowling ball and another portion of the cutting blade is located within the hole.

5. The method of claim 1, further comprising creating another bevel at another edge of another hole of the bowling ball by removing material from the bowling ball using the rotary tool and the shaping bit, wherein a shape and radius of the bevel are essentially the same as a shape and radius of the other bevel.

6. The method of claim 1, wherein the bevel has at least one of a predetermined radius, curvature, and shape defined by a profile of the shaping bit.

7. The method of claim 1, further comprising sanding the bevel after the creating the bevel.

8. The method of claim 1, further comprising removing excess material from the hole after the creating the bevel.

9. The method of claim 1, further comprising drilling the hole in the bowling ball before the creating the bevel, wherein the drilling comprises:
    providing a marking on the bowling ball in a predetermined relation to a center line and a center of gravity of the bowling ball;
    placing the bowling ball in a bowling ball drilling fixture;
    aligning the marking with a drill bit; and
    drilling the hole in the bowling ball with the drill bit at the marking.

10. The method of claim 1, further comprising prepping the bowling ball for beveling before the creating the bevel, wherein the prepping comprises at least one of:
    removing loose material from the hole after drilling; and
    securing the bowling ball to a work bench.

11. The method of claim 1, wherein the shield mounts to an underside of the router and elevates the router from a surface of the bowling ball.

12. The method of claim 1, wherein the shield vertically positions the router bit relative to the bowling ball.

13. The method of claim 1, further comprising adjusting the router so that an upper edge of a cutting blade of the router bit is located above an outer surface of the bowling ball and another portion of the cutting blade is located within the hole, wherein the adjusting is performed after the placing.

* * * * *